United States Patent

Denny

[15] 3,652,959

[45] Mar. 28, 1972

[54] ELECTRONICALLY VARIABLE RF ATTENUATOR

[72] Inventor: Hugh W. Denny, Decatur, Ga.

[73] Assignee: The United States of America as represented by the Secretary of the Air Force

[22] Filed: Jan. 26, 1971

[21] Appl. No.: 109,865

[52] U.S. Cl. ..........333/81 R, 307/237

[51] Int. Cl. ..........H01p 1/22

[58] Field of Search ..........333/81 R, 81 A; 307/237; 323/66

[56] References Cited

UNITED STATES PATENTS

| | | | |
|---|---|---|---|
| 3,093,802 | 6/1963 | Chow | 333/81 X |
| 3,323,080 | 5/1967 | Schwelb et al. | 333/81 X |
| 3,522,556 | 8/1970 | Ragan | 333/81 X |
| 3,529,266 | 9/1970 | King | 333/81 A UX |

*Primary Examiner*—Paul L. Gensler

*Attorney*—Harry A. Herbert, Jr. and George Fine

[57] ABSTRACT

An electronically variable RF attenuator is provided in which a pin diode is used as the variable resistance element to control the amplitude of very high frequency signals with essentially a zero degree phase shift over a wide frequency range. Cancellation of the phase-producing reactive components of the pin diode is accomplished by taking a small portion of the signal at the input to the diode, adding $\pi/2$ radians phase shift to the sample and subsequently subtracting the shifted sample from the diode output signal.

4 Claims, 1 Drawing Figure

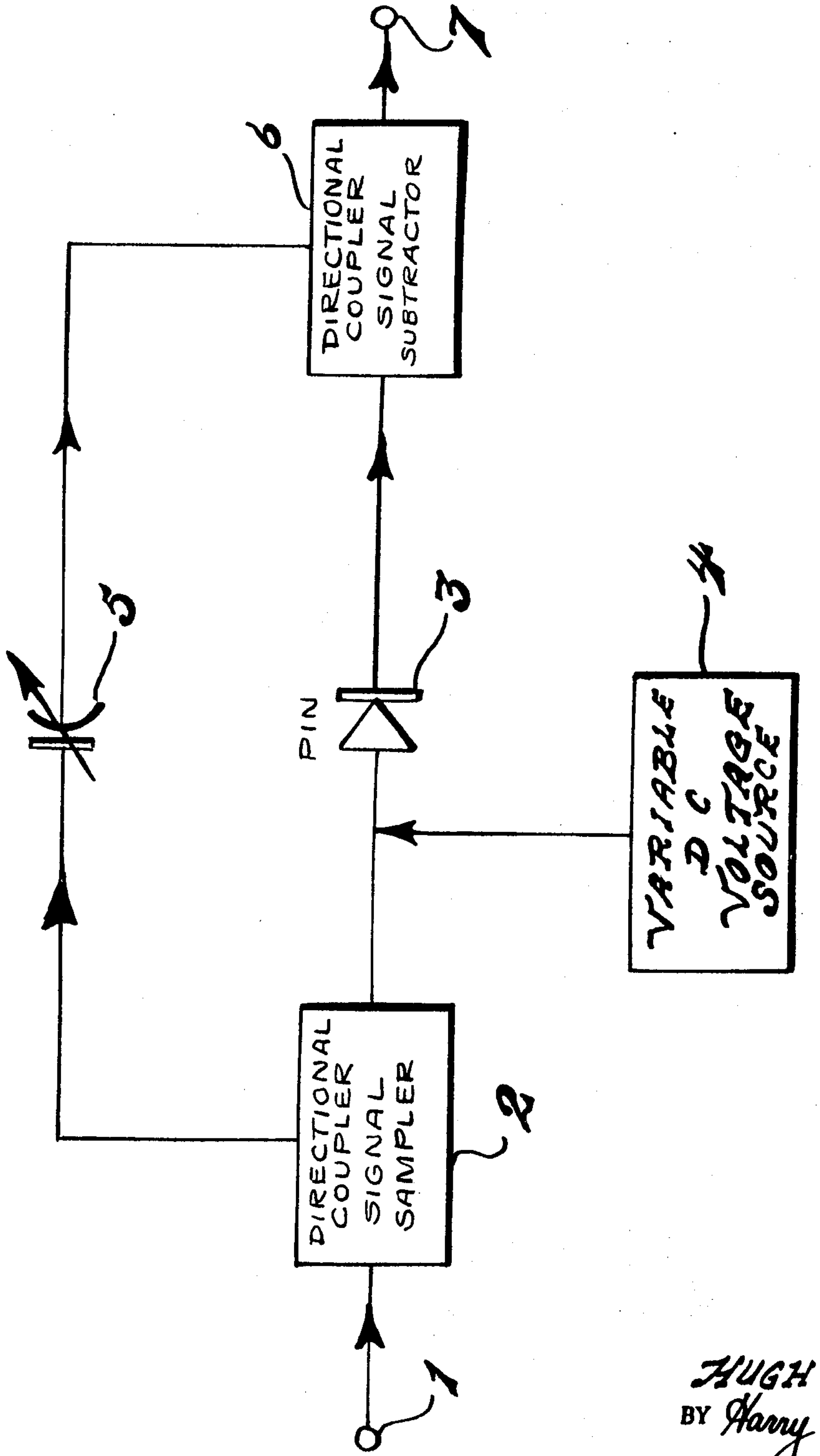
INVENTOR.
HUGH W. DENNY
BY Harry A. Herbert Jr. and George Fine
ATTORNEYS

ELECTRONICALLY VARIABLE RF ATTENUATOR

BACKGROUND OF THE INVENTION

This invention relates to variable attenuators, and more particularly, to an electronically variable, minimum phase shift attenuator for very high radio frequency signals.

A number of mechanical and electronic devices exist which can be used to control the amplitude of radio frequency signals. The most common device is the mechanically variable resistor, i.e., the potentiometer. At low frequencies, potentiometers behave as ideal variable resistances, that is, no additional phase shift is added to the transmitted signal as the resistance is changed. At high frequencies, however, inductive and capacitive components in the wiper arm and resistive element introduce appreciable phase shift into the signal as the amplitude is varied. Electronic devices such as variable resistance diodes can also be used to vary the amplitude of radio frequency signals. Again all known devices of this type produce a phase change in the signal of from zero up to $\pi/2$ radians as the attenuation varies from minimum to maximum. In many applications, particularly those involving feedback loops, such phase changes are intolerable. Therefore the objective of this invention is to provide a means for electronically controlling the amplitude of very high radio frequency signals which does not cause a significant variation in the relative phase shift of the controlled signals.

SUMMARY OF THE INVENTION

An electronically variable RF attenuator is provided in which a PIN diode is used as the variable resistance element. The resistance of the diode is a logarithmic function of current. The PIN diode exhibits an additional function capacitance of about 1 pf. in parallel with the variable resistance. This phase producing quadrature component is cancelled in the attenuator by taking a small portion of the signal at the input to the PIN diode, adding $\pi/2$ radians phase shift to the sample with a variable capacitor, and subsequently subtracting the shifted sample from the diode output signal.

An object of the invention is to provide an attenuator for electronically controlling the amplitude of very high radio frequency signals with essentially zero degree phase shift over a wide frequency range.

Another object of the invention is to provide an attenuator for electronically controlling the amplitude of very high radio frequency signals wherein a PIN diode is used as the variable resistance element.

Yet another object of the invention is to provide an attenuator for electronically controlling the amplitude of very high radio frequency signals wherein a PIN diode is used as the variable resistance elements with automatic means for compensating for phase shifting resulting from the PIN diode.

DESCRIPTION OF DRAWINGS

The single FIGURE of the invention, shows partly in block and partly in schematic form the preferred embodiment.

DESCRIPTION OF PREFERRED EMBODIMENT

Now referring in detail to the single FIGURE of the invention, there is shown terminal 1 receiving the input signal to be attenuated. The input signal is of a very high radio frequency such as in the region of 10 MHz. and above. The input signal is fed to signal sampler 2 which may be a conventional 10 db. directional coupler.

Conventional PIN diode 3 receives the input signal by way of signal sampler 2 and a preselected portion of the input signal is fed through variable capacitor 5 to signal subtractor 6. Signal subtractor 6 may be a conventional 10 db. directional coupler. Signal subtractor 6 also simultaneously receives a signal from PIN diode 3. PIN diode 3 is controlled by variable DC voltage source 4 so that as the DC voltage thereto is varied, the current and resistance therethrough changes in accordance therewith. Variable DC voltage source 4 is conventional and may include, as a matter of design choice, a radio frequency choke. The output signal from signal subtractor 6 is available at terminal 7.

In the operation of the electronically variable, minimum phase shift attenuator, PIN diode 3 is used as the variable resistance element because it exhibits a well defined resistance versus current characteristic above 10 MHz. The resistance of the diode is a logarithmic function of current which typically varies for 0.5 ohms at 15 ma. diode current to as high as 10,000 ohms at zero current in accordance with the variation of DC voltage supplied by variable DC voltage source 4. Since there are no moving parts and since the diodes are physically small, the lead inductance and package stray capacitances are minimized by mounting the device in a transmission line configuration.

The PIN diode exhibits an additional function capacitance of about 1 pf. in parallel with the variable resistance. This small capacitance cannot be integrated into a mounting fixture and thus will add a small quadrature component to the signal as it passes through the diode. This component is responsible for up to $\pi/2$ radians change in the phase of the signal as the diode bias current changes from zero current to 15 ma.

The function capacitance does not vary significantly as the forward diode bias current changes and therefore the quadrature component of the signal remains constant while the inphase portion of the signal is changing over a wide range. This phase producing quadrature component is cancelled in the attenuator by taking a small portion of the signal by way of signal sampler 2 at the input to diode 3, adding $\pi/2$ radians phase shift to the sample with variable capacitor 5, and subsequently subtracting with signal subtractor 6 the shifted sample from the diode output signal. Since the magnitude of the signal in the sample line is less than the magnitude of the signal line in the main (diode) line, a proportionately larger and thus more easily adjusted capacitor is used to balance the effects of diode capacitance.

Conventional directional couplers are employed as the sampling and subtraction devices to minimize the signal loss in the main line and to achieve a constant sampling ratio over a wide frequency range. Although directional couplers were used as the signal and subtraction devices, other samplers such as appropriately tapped transformers could be utilized.

A typical value for the insertion loss through a PIN diode at 300 MHz. is 25 db. Two 10 db. directional couplers provide approximately the correct level sample for cancellation. With the 10 db. couplers, balancing capacitor 5 is approximately 10 times the magnitude of the function capacitance.

The principal advantage to this technique is that an electronically variable attenuator is obtained which exhibits essentially zero phase variation over a very wide frequency range as the attenuation is changed from minimum to maximum and vice versa. It is also emphasized that one of the features of this invention is the cancellation of the phase-producing reactive components inherent to variable resistance devices to achieve an amplitude control device that does not also contribute differential phase shift to the signal whose level is being varied.

I claim:

1. An electronically variable RF attenuator having essentially zero degree phase shift over a wide frequency range comprising a signal sampler receiving as an input signal very high radio frequency signals in the region of 10 MHz. and above, said signal sampler providing a pair of outputs, the first being a sample of a preselected portion of said input signal and the second being essentially said input signal, a PIN diode receiving said second output signal, a variable DC voltage source connected to said PIN diode to selectively vary the current and thus the resistance therethrough to obtain the desired attenuation, means to add $\pi/2$ radians phase shift to said first output signal, and means to subtract the shifted signal from the PIN diode output signal to obtain an attenuated output signal.

2. An electronically variable RF attenuator as described in claim 1 wherein said means to add $\pi/2$ radian phase shift is comprised of a variable capacitor.

3. An electronically variable RF attenuator as described in claim 1 wherein said signal sampler is comprised of a 10 db. directional coupler.

4. An electronically variable RF attenuator as described in claim 1 wherein said means to subtract is comprised of a 10 db. directional coupler.

* * * * *